Nov. 8, 1960    B. WOODWARD, JR., ET AL    2,959,126
VIBRATION CONTROLLED MINE Filed March 31, 1944      8 Sheets-Sheet 1

Inventors
B. WOODWARD, JR.
G. N. WILLIS

By W. Glenn Jones

Attorney

Nov. 8, 1960 B. WOODWARD, JR., ET AL 2,959,126
VIBRATION CONTROLLED MINE
Filed March 31, 1944 8 Sheets-Sheet 2

Inventors
B. WOODWARD, JR.
G. N. WILLIS

Nov. 8, 1960   B. WOODWARD, JR., ET AL   2,959,126
VIBRATION CONTROLLED MINE
Filed March 31, 1944   8 Sheets-Sheet 4

FIG. 6.

Inventors
B. WOODWARD, JR.
G. N. WILLIS

By Wesley Jones

Attorney

United States Patent Office 2,959,126
Patented Nov. 8, 1960

2,959,126

VIBRATION CONTROLLED MINE

Bernard Woodward, Jr., 1509 28th Place S.E., and Grant N. Willis, 1350 Dexter Terrace S.E., both of Washington, D.C.

Filed Mar. 31, 1944, Ser. No. 528,916

14 Claims. (Cl. 102—19.2)

(Granted under Title 35, U.S. Code (1952), sec. 266)

This invention relates to mines adapted to be controlled by vibrations received thereby and more particularly to mines adapted for use in damaging railroad tracks and equipment in response to vibrations received from a moving train.

In devices of this general class heretofore proposed it has been the usual custom to provide an attachment to the rail or tie whereby the firing of the mine is caused by pressure applied thereto by the wheels of the vehicles or by movement of the tie in response to the approach of a train, as the case may be. Such devices have been found to be not altogether satisfactory under the conditions of service for the reason that considerable time and difficulty are required in installing the mine and in making the necessary control connection between the mine firing mechanism and the rail or tie, and furthermore these devices are in general adapted to fire in response to the passage of the first train over the planted mine.

The mine of the present invention possesses none of the foregoing disadvantages by reason of the fact that the mine may be planted within the roadbed, preferably between the ties and beneath the rails, in either a vertical or horizontal position, as desired, and fired by vibrations received through the surrounding earth or roadbed without the necessity of establishing a control connection between the mine and the rails or ties. Furthermore, the mine is provided with a counting mechanism adapted to be controlled selectively by the aforesaid vibrations received through the ground in which means are employed for counting the number of trains passing the mine and delaying the firing of the mine until a predetermined number of trains has been counted. Furthermore, the mine also includes means for preventing more than a single actuation of the counting mechanism in response to the passage of a train. An arrangement is thus provided in which the mine is adapted to be fired in response to a selected train and thus damage or destroy the track sufficiently to cause the train to be derailed.

The mine includes a firing mechanism of relatively small and compact design having a vibrationally responsive switch or firing element adapted to close a pair of contacts in response to vibrations received through the surrounding terrain. The mine also includes an explosive charge adapted to be fired by the firing mechanism and of sufficient size to damage or destroy the track and cause derailment of the train firing the mine. By providing a mine of relatively small and compact structure, the mine may be easily transported and planted by a single person within a relatively short period of time either by screwing the mine into the roadbed or planting the mine within a small excavation within the roadbed between the ties and beneath the track thereof.

The mine includes an arming mechanism controlled by an arming wire which is withdrawn when the mine has been arranged within the roadbed and thus the mine is rendered perfectly safe during the transportation and handling thereof and there is no possibility of prematurely firing the mine until the mine has been planted. Furthermore, the arming of the mine is delayed after the arming wire is withdrawn for a predetermined period of time sufficient to enable the operative to replace the roadbed sufficiently to conceal the mine and retire to a safe distance before the mine becomes armed.

One of the objects of the present invention is the provision of a land mine adapted to be fired by vibrations received through the ground from a moving vehicle and without contact by the vehicle.

Another of the objects is the provision of a new and improved mine adapted to be fired by a predetermined number of series of vibrational signals received through the surrounding ground corresponding to the movement of a predetermined number of vehicles past the mine.

Another object is a new and improved mine adapted to destroy a railroad sufficiently to derail a train in which means are provided for delaying the arming of the mine until a predetermined period of time has elapsed after the mine has been planted.

Another object is the provision of a new and improved vibration controlled mine adapted to be planted along a right of way in which means are provided for counting the number of vehicles moving past the mine regardless of the time of travel of each vehicle past the mine.

Still another object is a new and improved vibration controlled mine adapted to be planted beneath a railroad track in which means are provided for firing the mine beneath a selected train moving along the track.

Still another object is to provide a mine which may be quickly and easily planted along the right of way of a railroad by an operative in which the mine is fired by vibrations received from a train through the surrounding ground without employing a control connection from the mine to the rail or ties.

A still further object is the provision of a new and improved mine for the destruction of moving vehicles which will be economical to manufacture, safe to handle and transport, and which possesses all the qualities of reliability and effectiveness in service.

A further object is to provide a vibration controlled mine adapted to be fired adjacent a selected moving vehicle in which the mine is unarmed during the passage of each of the vehicles past the mine prior to passage of the selected vehicle.

Still other objects, advantages and improvements will be apparent from the following description taken in connection with the accompanying drawings, of which:

Fig. 19 is an elevational view partly broken away and partly in section of an alternative form of a mine in accordance with the present invention; and, Fig. 20 illustrates diagrammatically a complete electrical system suitable for use with the mine of the present invention.

Figures 1, 2, 3:
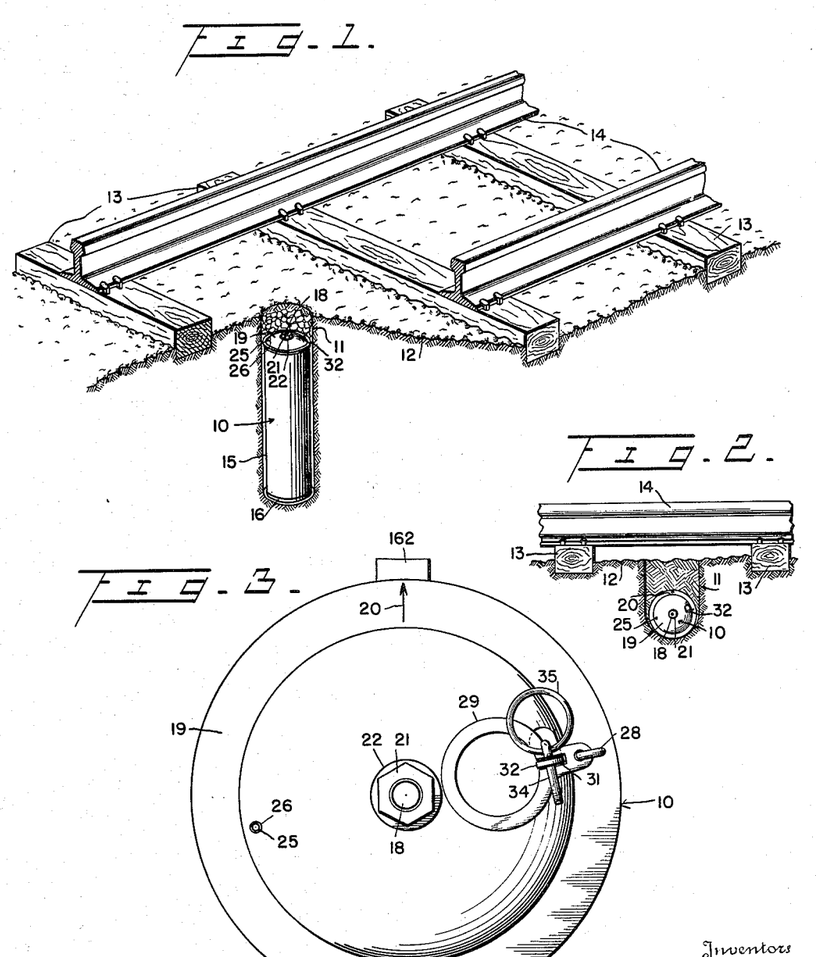
Fig. 1 is a detailed perspective view of the device plated beneath a section of track along a right of way.
Fig. 2 is a view of the device arranged beneath a section of track in a substantially horizontal position.
Fig. 3 is an enlarged plan view of the device of Fig. 1.

Referring now to the drawings for a more complete understanding of the invention on which like numerals of reference are employed to designate like parts throughout the several views and more particularly to Fig. 1 thereof, there is shown thereon a mine indicated generally by the numeral 10 planted in a vertical position within an excavation 11 within the roadbed 12 between the ties 13 upon which are arranged the rails 14 comprising the right of way of a railroad. On Fig. 2 is shown the mine 10 planted in a horizontal position within a roadbed between the ties 13 and beneath the rails 14.

Figure 4:
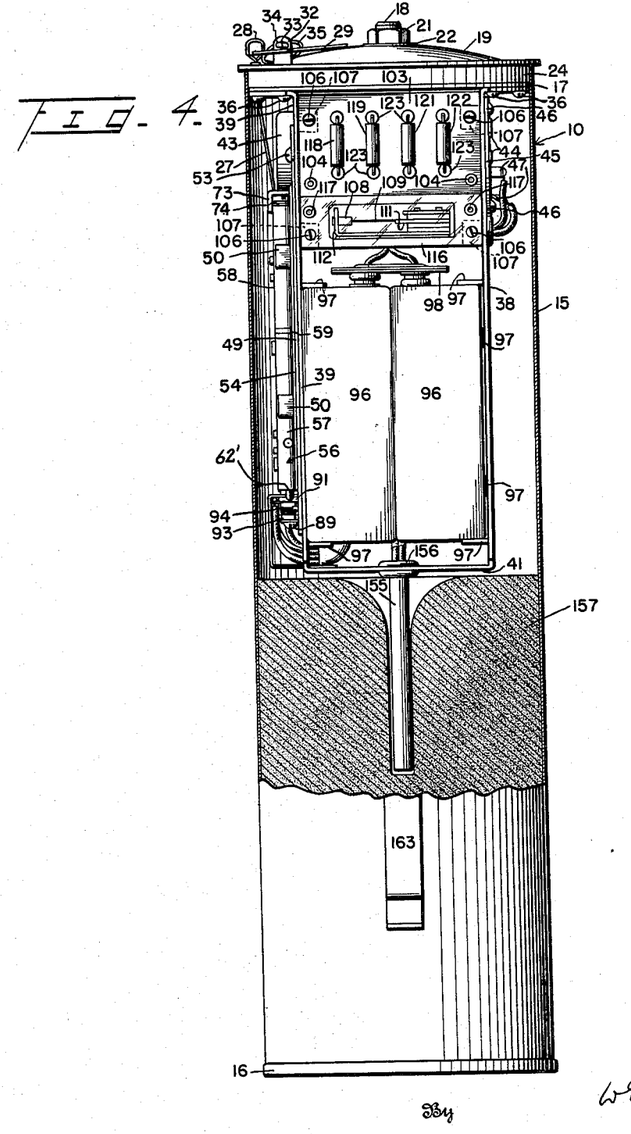
Fig. 4 is a view partly in elevation and partly in section of the device.

The mine comprises a casing 15 preferably cylindrical in shape and enclosed at one end thereof by a plate or cover 16, Fig. 4, and at the other end by a plate 17 having a stud or bolt 18 arranged therein and adapted to clamp a cover 19 thereto by reason of the provision of a nut 21 threaded on the stud, a washer 22 preferably being provided between the nut and cover 19. The plate 17 is provided with an annular recessed portion 23 adapted to receive a gasket 24 composed of material suitable for the purpose such, for example, as soft rubber or any of the synthetic varieties thereof, whereby the gasket is compressed by the plate and cover 19 sufficiently to effect a watertight seal between the plate 17 and the casing 15 of the mine as the nut 21 is tightened. The angular position of the cover with respect to the plate 17 is continuously maintained by reason of the provision of a dowel pin 25 in registered engagement with an aperture 26 within the cover. The cover 19 is also preferably provided with a distinctive mark such, for example, as the arrow 20 on the outer surface thereof to facilitate arranging the mine in a horizontal planted position in a predetermined angular setting with respect to the axis thereof corresponding to a predetermined position of the vibration actuated switch mechanism disposed therein. There is also provided within the cover, the gasket, and the plate 17 respectively, a plurality of alined apertures adapted to receive an arming wire 27 having the outer end thereof formed into a loop at 28 to which is secured the annular member 29 having a slotted portion 31 therein adapted to receive a tab 32 formed in the cover 19, the tab having an aperture 33 therein within which is disposed a cotter pin 34 to which is secured the ring 35 arranged in abutting relation with the annular member 29 in such a manner as to prevent substantial movement of the annular member and removal of the arming wire until the cotter pin has been withdrawn from the tab 32.

Secured to the plate 17 in any suitable manner as by welding the parts together or by the screws 36, as the case may be, is a bifurcated frame 37 comprising a pair of inwardly extending plates or portions 38 and 39 and a transverse connecting portion 41 therebetween. The plates 38 and 39 are each provided with an aperture adapted to receive and support a condenser 42, a pair of caps or bushings 43 being arranged between the condenser and the plates to prevent an electrical connection therebetween. The condenser is secured at one end thereof, as by the tabs 44, to a mounting plate 45 composed of suitable insulating material such as Bakelite, the mounting plate 45 being attached to the plate 38 as by the screws 46. The condenser is provided with a pair of terminals 47 adapted to be connected to conductors and thereby establish an external electrical connection to the condenser.

The plate 39 is provided with a bent up portion 48 adapted to engage the member 49 at the bifurcated portion 51 thereof but not sufficiently to prevent movement of the member 49 with respect to the plate 39. The opposite end of the member 49 is provided with a slotted portion 52 within which is disposed a screw 53 adapted to clamp the member 49 in a predetermined fixed position with respect to the plate 39. The member 49 is also provided with a pair of tabs or stops 50 for engagement with the arming mechanism 56 and a reinforcing rib 54.

The plate 39 is also provided with two clamps or guides 55 adapted to receive and support a delayed action arming mechanism indicated generally by the numeral 56 and comprising a pair of tubular members 57 and 58 secured together in alinement with each other in any suitable manner as by the coupling device 59, the tubular member 58 being relatively weaker than the member 57 for a reason which will become more clearly apparent as the description proceeds. The lower end of the tube 57 is enclosed by a cap 61 within which is slideably disposed a plunger 62 at the reduced portion 62' thereof. The plunger is releasably locked in an initial unarmed position by a rod 63 slideably supported by a pair of tabs 64 formed on the plate 39, one end of the rod passing transversely through an aperture within the plunger 62 and a pair of diametrically arranged apertures alined therewith within the tubular member 57. The rod 63 is provided with a pin or bar 65 therein in engagement with a washer 66, the washer being urged thereagainst by a spring 67. One end of the spring 67 is in engagement with a washer 68 disposed between the spring and one of the tabs 64 whereby the rod 63 is moved by the spring 67 from the path of travel of the plunger 62 as the arming wire 27 is withdrawn from an aperture within the rod 63.

There is also provided a plunger 69 slideably disposed within the tube 57 and urged by a spring 71 toward the plunger 62, the plunger normally being restrained from moving into engagement with the plunger 62 by a wire or rod 72 connected thereto and secured as by the screw 73 and washer 74 to a plug 75 arranged within the upper end of the tube 58 and secured thereto. The wire 72 is composed of metal suitable for the purpose such, for example, as steel or Phosphor bronze adapted to be attacked and severed by the action of a corrosive fluid 76, normally contained within a glass ampule 77, when the ampule is broken, the ampule being normally supported in any well known manner by a pair of pads 70 composed of material suitable for the purpose such, for example, as cotton. The liquid is prevented from seeping through the coupling 59 by a seal 60 within which the wire 72 is slideably arranged.

The lower portion of the plunger 69 is tapered as at 78 sufficiently to engage a reduced cylindrical portion or register 79 within the rod 63 and prevent movement of the rod from the initial locked position thereof in the event that the aforesaid ampule should be broken before the arming wire 27 is removed from the mine.

The plate 39 has formed therein a pair of tabs 80 within which is slideably supported a rod 81 having a pin 82 therein adapted to be engaged by a washer 83 held securely thereagainst by a spring 84, one end of the spring being in engagement with the washer 83 and the opposite end of the spring being in engagement with an additional washer 85 in abutting relation with one of the tabs 80. The rod 81 is normally maintained in a retracted position by the arming wire 27 passing through an aperture 90 within the rod and in abutting relation with the other of the tabs 80. The spring 84 is adapted to cause the rod 81 to strike the cylindrical member 58 with sufficient force to break the ampule 77 disposed therein and bring the corrosive fluid into contact with the rod 72 in response to the removal of the arming wire 27 from the mine. The member 49, it will be noted, is provided with a bent up portion 86 adapted to engage the screw 73 and the cylindrical member 58 sufficiently to prevent relative movement between the arming mechanism 56 and the plate 39 until the arming wire has been withdrawn from the mine.

Figure 10:
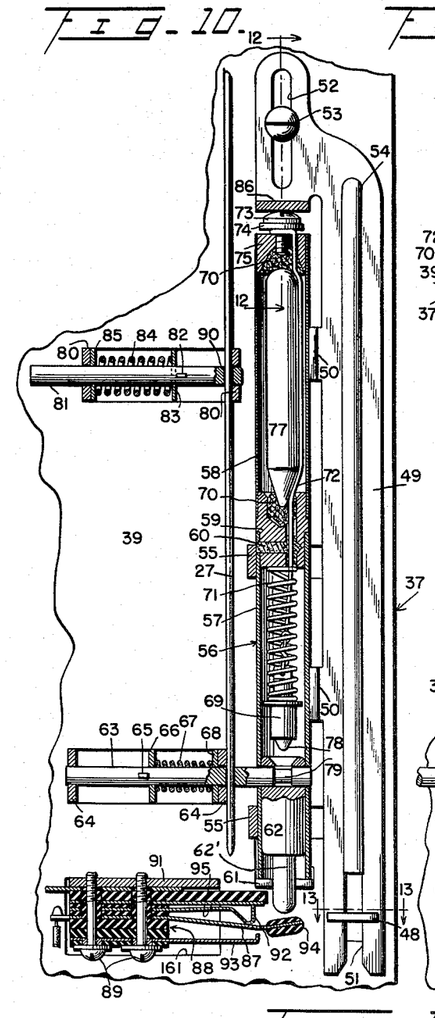
Fig. 10 is a fragmentary view of the arming mechanism with the arming wire in the assembled position.
Figures 11, 12:
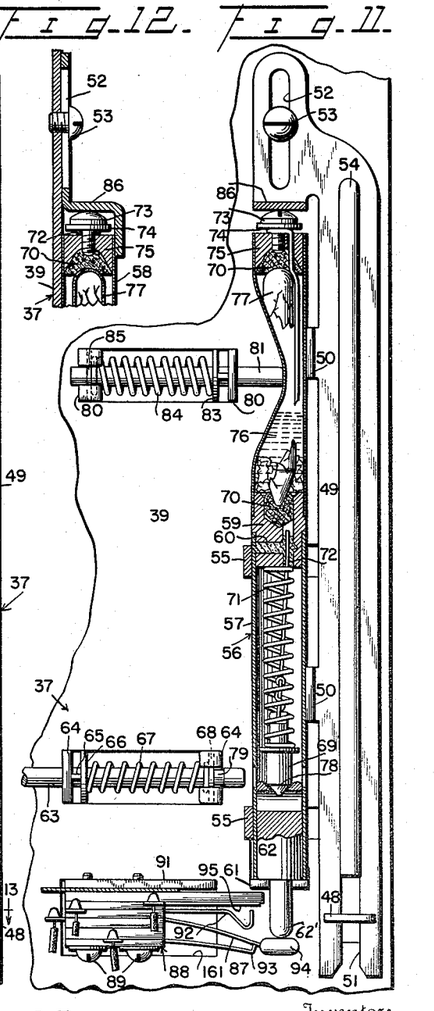
Fig. 11 is a view of the arming mechanism showing the arming wire removed and the arming switch operated.
Fig. 12 is a fragmentary view taken along the line 12—12 of Fig. 10.
Figure 13:
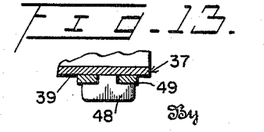
Fig. 13 is a view taken along the line 13—13 of Fig. 10.
Figures 13, 14, 15, 16, 17, 18:
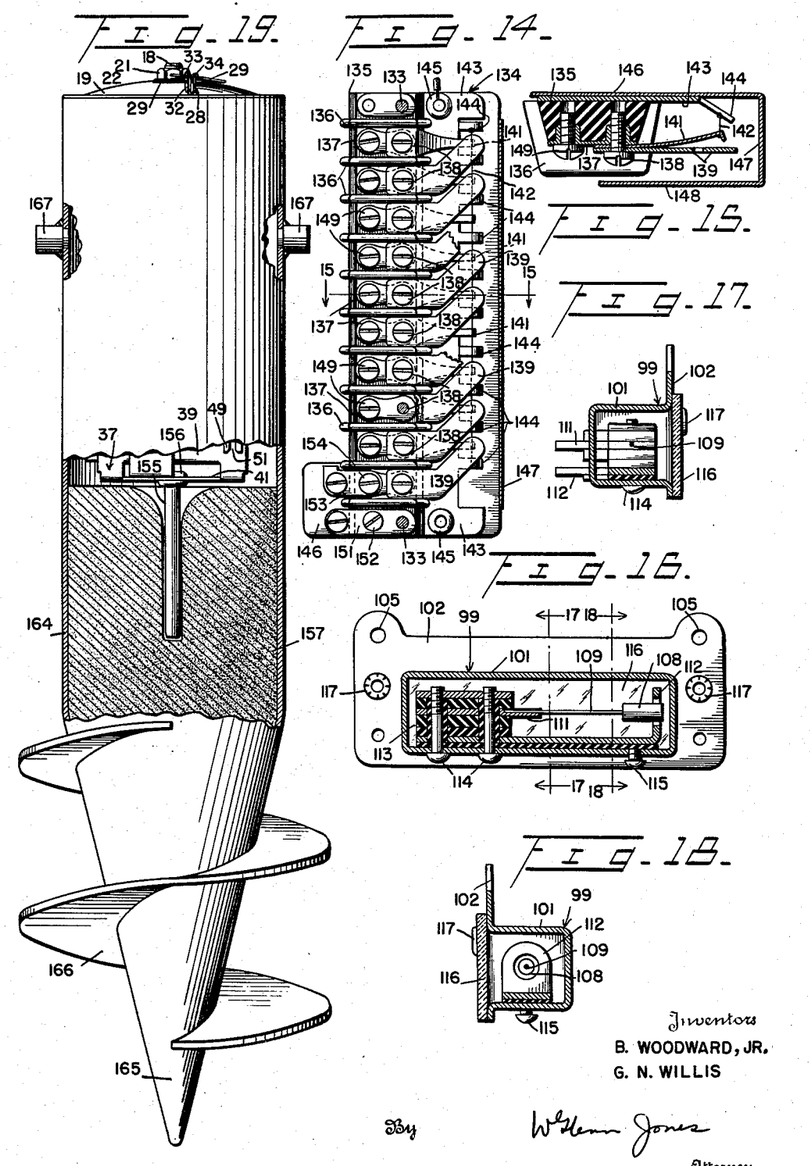
Fig. 14 is a view in elevation of the counting mechanism employed with the device.
Fig. 15 is a view taken along the line 15—15 of Fig. 14.
Fig. 16 is a detailed rear elevational view in section of the vibrationally responsive firing contact mechanism.
Fig. 17 is a view taken along the line 17—17 of Fig. 16.
Fig. 18 is a view taken along the line 18—18 of Fig. 16.

The plunger 62 is adapted to be moved by the spring 71 to the armed position shown on Fig. 11, the movement of the plunger in the armed position being arrested by the stop member 61. As the plunger 62 moves into the armed position, the outer end thereof engages a movable element 87 of an arming switch 88 secured by the screws 89 to a tab 91 formed on the plate 39, and causes the movable element 87 to be disengaged from the spring contact 92 and brought into engagement with the contact element 93. The movable element 87 is preferably provided with an insulating member 94 adapted to be engaged by the plunger 62 and thereby actuate the movable element 87 to an armed position without establishing an electrical connection between the plunger and the element 87. The spring contact 92 is normally in engagement with the contact member 95, Fig. 10, and adapted to be disengaged therefrom as the movable element 87 moves into the armed position. The contact elements of the switch 88 are clamped together by the screws 89 and insulated from each other and from the plate 39 in any well known manner as by the insulating devices illustrated. There is also provided within the bifurcated frame 37 a battery indicated generally by the designation BA and preferably comprising a pair of cell assemblies 96 maintained in the assembled position with respect to the bifurcated frame by reason of the provision of the tabs 97 thereon. The cells are connected together in any well known manner as by the connector 98 to which is secured a pair of flexible conductors for connecting the battery to the contacts of the arming switch and the mine firing mechanism respectively.

There is also provided within the bifurcated frame 37 a vibration actuated switch mechanism or signal detecting device indicated generally by the numeral 99 comprising a casing 101 having a panel or plate 102 adapted to be secured to the panel 103 as by the rivets 104 disposed within the apertures 105 on the aforesaid plate. The arming switch 99 and panel 103 are thus assembled into a unitary structure adapted to be secured to the bifurcated frame 37 as by the screws 106 and the tabs 107 formed on the frame.

The arming switch 99 comprises a mass 108, preferably cylindrical in shape and supported by a flexible resilient rod or wire 109 secured in any suitable manner to a supporting plate 111 whereby the mass 108 is adapted to be moved vibrationally in response to a shock or a sudden wave of pressure received by the device into engagement with an L shaped contact element 112 having an annular contact surface therein within which the mass 108 is coaxially disposed and normally disengaged therefrom. The casing 101 is provided with an aperture 113, Fig. 7, of sufficient size to allow a pair of terminals formed on the elements 111 and 112 to project therefrom without making electrical contact with the casing. The elements 109 and 112 are maintained within the casing 101 as by the screws 114 and insulated therefrom in any well known manner, an adjusting screw 115 being provided to adjust the annular contact surface of the L shaped member into coaxial relation with the cylindrical mass 108. The casing 101 is preferably enclosed by a plate 116 of suitable transparent material secured thereto as by the rivets 117 thereby to exclude dirt and other foreign matter from the contact elements 108 and 112.

Figure 7:
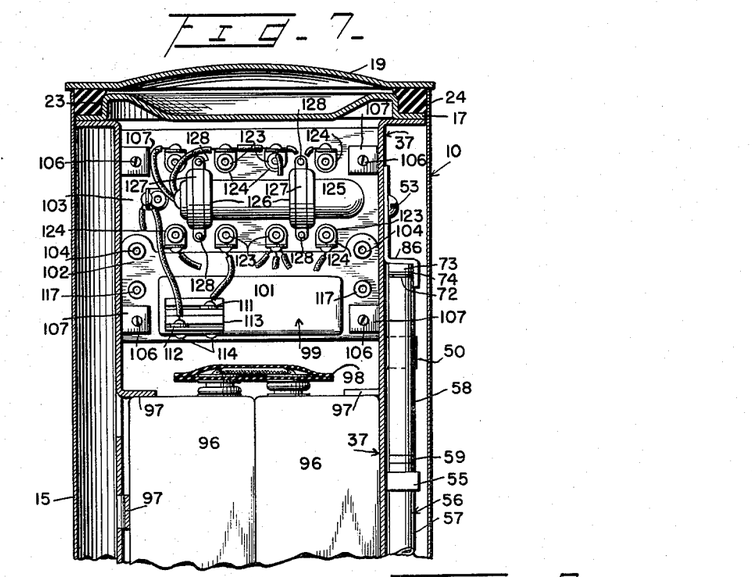
Fig. 7 is a sectional view taken along the line 7—7 of Fig. 5.
Figure 8:
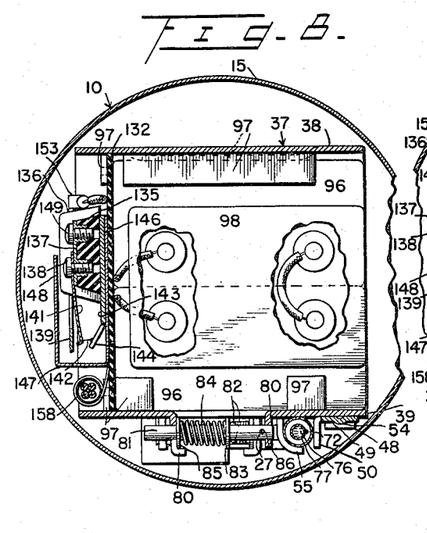
Fig. 8 is a view taken along the line 8—8 of Fig. 5.
Figure 9:
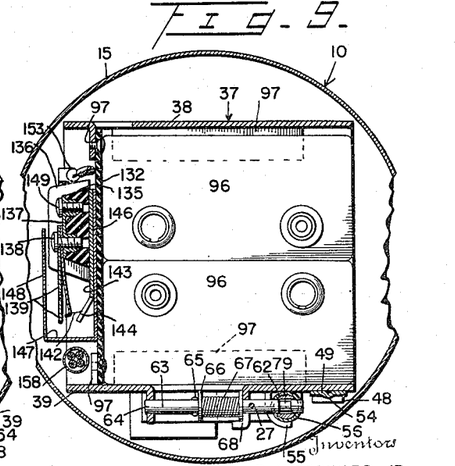
Fig. 9 is a view taken along the line 9—9 of Fig. 5.

There is also provided on the panel 103 a plurality of resistance devices 118, 119, 121 and 122 secured thereto in any convenient manner as by the grommets 123 through which the terminal conductors to the resistance devices are connected, the circuit therefrom being continued by way of terminal connectors 124, Fig. 7, with which the grommets are connected. On the inner portion of the panel 103, is mounted a triode tube 125, preferably of the cold cathode type, by means of the resilient mountings 126 and clamps 127 therefor, the clamps being secured to the panel as by the rivets 128.

Figure 6:
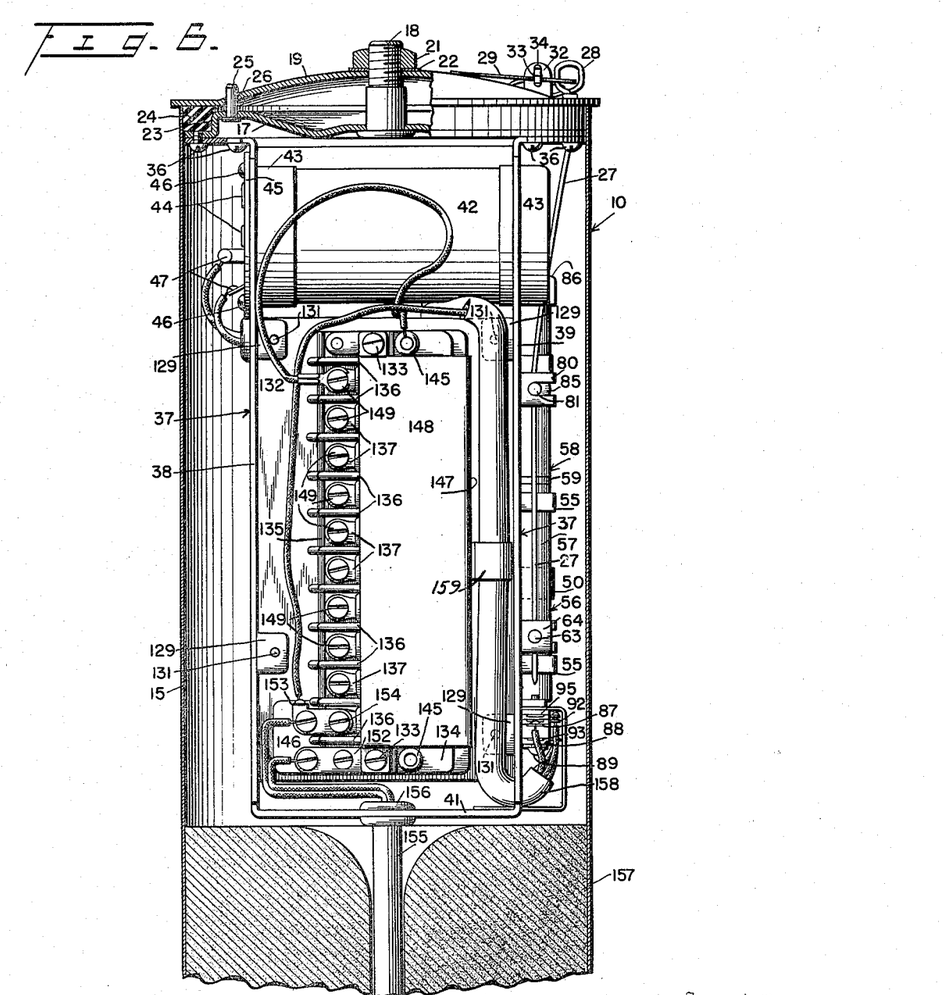
Fig. 6 is a side view partly in section and partly broken away of the device of Fig. 5.

The plates 38 and 39, Fig. 6, are provided with a plurality of tabs 129 formed thereon to which is secured, as by the rivets 131, a panel 132 composed of insulating material suitable for the purpose such, for example, as Bakelite or the like on which is mounted as by the screws 133 a counting mechanism indicated generally by the numeral 134 and adapted to establish an electrical connection between the detonator and the detecting device 99 when a predetermined number of firing signals have been applied to the counting mechanism corresponding to a predetermined setting of the counting mechanism.

The counting mechanism comprises a base or support 135 composed of insulating material suitable for the purpose and having a plurality of ribs 136 formed thereon. Molded between each pair of adjacent ribs respectively is one of a plurality of inserts 137 of suitable electrical conducting material to which is secured as by the screws 138 a contact plate 139 and a spring contact element 141, each contact plate being adapted to be engaged by the contact element 141 of an adjacent plate as a fuse 142 secured thereto is operated or melted by a flow of current therethrough. Each of the fuses 142 is connected to a metallic plate 143 at one of the projecting portions 144 thereof and to each of the spring contact members 141 whereby each of the contact members 141 is restrained from engaging the plate 139 of the next adjacent contact member 141 until the fuse 142 associated therewith has operated. The plate 143 is arranged beneath the support 135 and clamped thereto by the screws 133 and 145, a shield of suitable transparent insulating material 146 being preferably arranged between the plate 143 and the aforesaid panel 132, the shield being formed as at 147 and 148 thereby to enclose and protect against accidential short circuit, the contact and electrical conducting elements of the counting mechanism. By employing a shield composed of transparent material, the operated condition of the counting mechanism may be observed during the assembly and test of the firing control mechanism of the mine.

Figure 5:
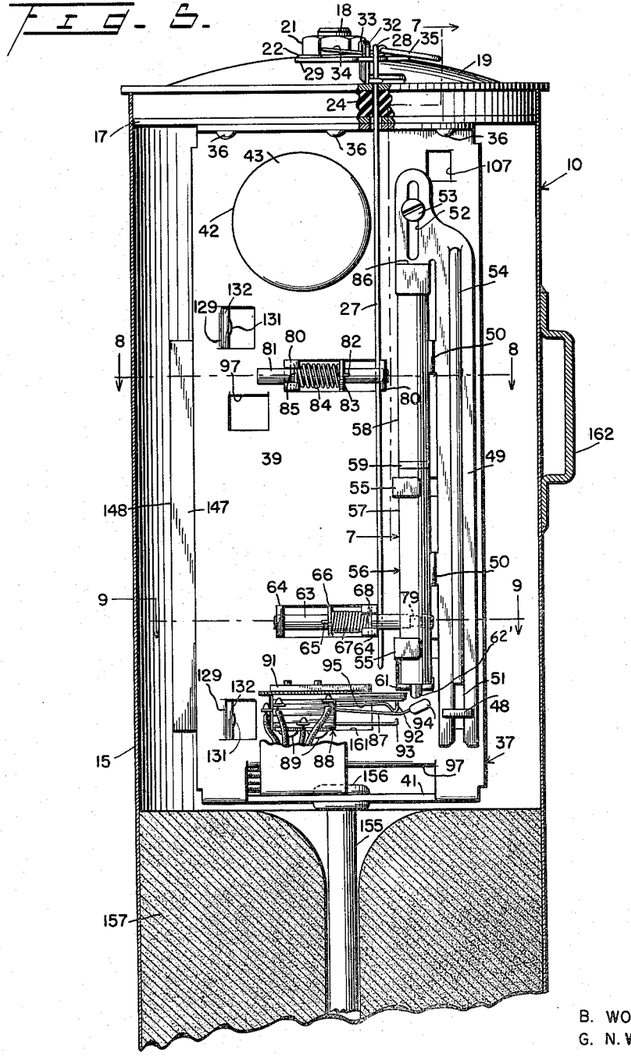
Fig. 5 is an enlarged detailed view partly broken away of the device showing the arming mechanism therefor.

Each of the pairs of contact elements is in electrical circuit with a terminal screw 149 threaded within an insert 137 by means of which an external circuit may be established to a selected pair of contact elements 141 and 139 selectively in accordance with the number of firing signals required to connect the detonator to the firing circuit. The plate 143, it will be understood, is in electrical circuit with the screws 145 and with the connector 151 as by the screw 152 and the contact plate 139 adjacent thereto is in electrical connection with the connector 153 as by the screw 154. When a sufficient number of firing impulses has been received to operate and destroy the fuse associated with the spring element 141 adjacent the contact plate 139 to which the connector 153 is connected, a circuit is closed by way of the connector 153 to the detonating device 155, Fig. 5, secured to the laterally extending portion 41 of the frame 37 in any suitable manner as by the support 156. With the firing mechanism in the assembled position within the casing of the mine, the detonator is arranged within a recessed portion of and explosive charge 157 disposed within the mine casing 15.

The wires connected to the arming switch 88 are preferably enclosed within a flexible sleeve 158, Fig. 6, composed of suitable insulating material and secured to the panel 132 as by the clamp 159, the frame 37 being preferably provided with an aperture 161, Fig. 10, within the portion 39 thereof of sufficient size to permit an end portion of the sleeve 158 to be disposed therein. The casing 15 is also preferably provided with a pair of brackets or straps 162 and 163 secured exteriorly thereto in any suitable manner as by welding the parts together and adapted to receive a suitable strap whereby the mine may be carried suspended from the belt of an operative in a manner to escape detection by an observer. By providing a pair of brackets secured to the casing of the mine in the manner shown, the mine is readily adapted to be secured to an object to be destroyed such, for example, as the under side of a bridge.

In Fig. 19 is shown a mine according to an alternative form of the present invention in which the casing 164 of the mine comprises a tapered portion 165 about which is arranged a helical member or screw 166 secured thereto as by welding the parts together and adapted to force the mine into the ground as the mine is rotated by a suitable tool such, for example, as a large T-handle wrench adapted to be detachably engaged by a pair of diametrically arranged lugs 167 secured to the casing 164 at the upper portion thereof. An arrangement is thus provided in which the mine is adapted to be screwed into the ground or into a rock ballasted roadbed without employing a post hole digger or other excavating tool for this purpose. After the mine has been screwed into the earth or into the roadbed ballast, as the case may be, for a distance sufficient to permit concealment of the mine, the wrench is removed therefrom, the arming wire is withdrawn by means of the annular member 29 secured thereto, and the roadbed or earth rearranged to conceal the mine from view.

Figure 20:
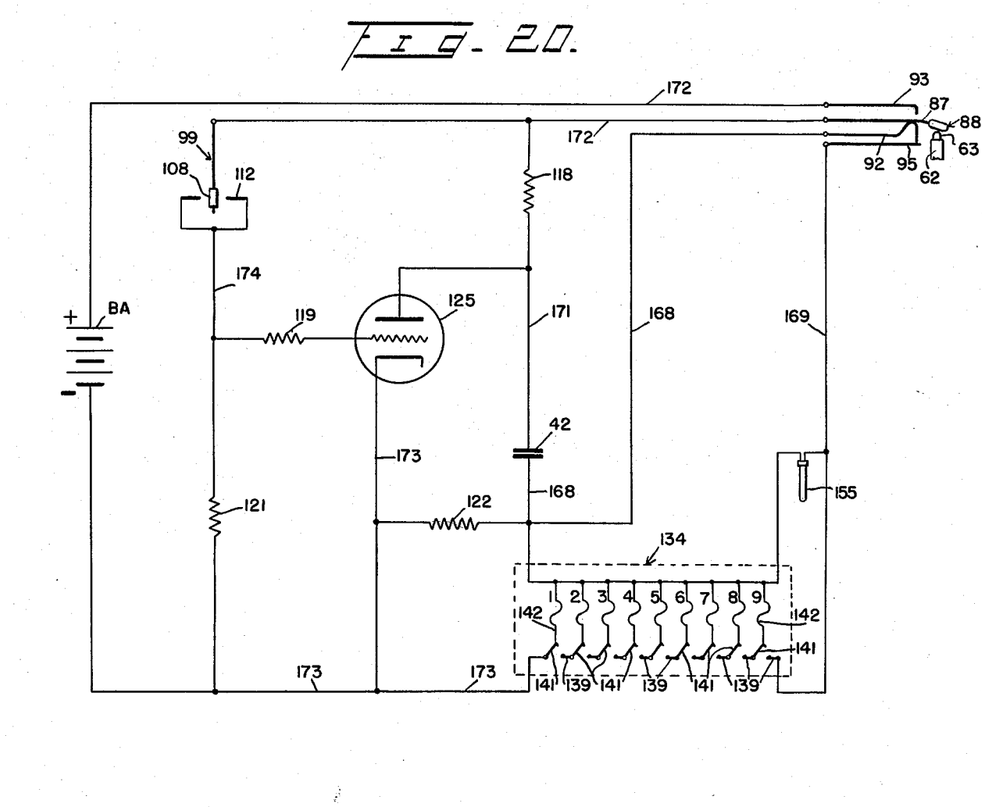

The operation of the mine will best be understood from a consideration of Fig. 20 on which is shown in diagrammatic form the circuits and instrumentalities comprising the complete electrical system of the mine.

Let it be assumed by way example, that the counting mechanism is connected to the firing circuit such that ten series of vibrations received in time spaced relation are required to fire the mine and that the mine has been planted within the roadbed of a railroad substantially as shown in Fig. 1. Let it also be assumed that the safety pin 34 and the arming wire 27 have been withdrawn and the roadbed rearranged to conceal the mine from an observer. As the arming wire is withdrawn from the rod 63, the spring 67, Fig. 11, causes the rod to be moved out of locking engagement with the plunger 62 whereby the plunger 62 is adapted to be moved to the armed position by the plunger 69.

As the arming wire is withdrawn from engagement with the rod 81, the spring 84 causes the rod to strike the tubular member 58 with sufficient force to crush the glass ampule 77 therein and release the acid from the ampule. When sufficient time has elapsed for the acid to sever the rod or wire 72, the plunger 69 is moved by the spring 71 into engagement with the plunger 62 thereby causing the plunger 62 to be moved to the armed position shown on Fig. 11 in engagement with the insulating member 94 of the movable element 87 and causing the arming switch 88 to be operated. As the element 87 moves away from the initial unarmed position, the spring contact 92 is disengaged from the contact member 95. When this occurs, a short circuit including conductors 168 and 169 connecting the contact elements 92 and 95 to the detonator 155 is interrupted and the detonator, therefore, is now rendered responsive to a voltage applied thereto.

As the movable contact element 87 is disengaged from the spring contact 92 a short circuit across condenser 42 is removed, the circuit including conductors 168, 171, resistance 118 and conductor 172. As the element 87 moves into engagement with contact member 93 a circuit is closed from the positive terminal of battery BA by way of conductor 172, contact elements 93 and 87 of the arming switch 88, conductor 172, resistance 118, conductor 171 to condenser 42 from whence the circuit is continued by way of conductor 168, resistance 122 in parallel with the first fuse 142 of the counting mechanism 134, spring contact element 141, conductor 173 to the negative terminal of battery BA. Resistance 118 is of sufficient size such that the condenser 42 is not charged to a potential sufficient to cause the cold cathode tube 125 to strike an arc in response to the closure of the contacts of the detector switch device 99 until a period of time such, for example, as two minutes has elapsed after the contacts 87 and 93 are brought into engagement with each other. When the potential of the condenser has been raised to a value sufficient to enable an arc to be struck within the tube 125, the mine is armed.

As the contacts of the detector switch mechanism 99 are brought into engagement with each other in response to vibrations received from a train approaching or moving past the mine, a circuit is closed from the positive terminal of battery BA by way of conductor 172, contacts 93 and 87 of the arming switch, conductor 172, contacts of the detector switch 99, conductor 174, resistance 119 and thence to the control element of the tube 125 thereby raising the potential of the control element to a value sufficient to fire the tube. When this occurs, a circuit is closed from the charged condenser 42 by way of conductor 171, the plate and cathode elements of tube 125, conductor 173, the first spring contact element of the counting mechanism 134 and fuse 142 associated therewith, from whence the circuit is continued by way of conductor 168 to the other plate of the condenser 42, thereby causing the first fuse of the counting mechanism to blow and release the spring contact element 141 associated therewith. The contact element 141 now moves into engagement with the contact plate 139 associated with the second fuse of the counting mechanism. The second fuse is not operated at this time, however, by reason of the provision of the resistance 122 connected between conductors 173 and 168 and of sufficiently low value as to reduce the charge on the condenser 42 to a value such that the potential applied to the plate of the tube 125 is insufficient to maintain the arc discharge of the tube and the tube, therefore, is extinguished before sufficient time has elapsed for the second fuse to be blown.

As the tube is extinguished, condenser 42, it will be understood, is again charged by potential received from the battery BA, the rate of charge, as heretofore stated, being relatively low by reason of the provision of the resistance 118 in the charging circuit of the condenser. The contacts of the detector switch 99 are repeatedly closed and disengaged in response to additional vibrations received from the passing train and the potential of the grid of the tube 125 is raised sufficiently to cause ionization of the gas within the tube. When this occurs, the tube emits a faint orange glow, and a relatively low current of insufficient strength to blow one of the fuses 42 or fire the detonator, as the case may be, flows between the cathode and the grid of the tube. The tube, however, does not strike an arc at this time by reason of insufficient voltage being applied to the plate element thereof. The condenser 42 is thus prevented from acquiring a charge sufficient to allow the tube to arc and blow another fuse, or fire the detonator until the contacts of the switch mechanism 99 have remained continuously disengaged for a suitable period of time such, for example, as one half minute. An arrangement is thus provided in which a passing train causes only one operation of the counting mechanism 134.

When the train has passed the mine, the vibrations of the contacts of the switch 99 are reduced sufficiently for the contacts to remain continuously disengaged and condenser 42 is again charged to the potential of the battery BA. The mine is now in readiness to count the passage of another train.

As the second train approaches the mine sufficiently near for the contacts of the detector switch 99 to close, the tube 125 is again fired thereby causing the second fuse of the counting mechanism to be operated by the discharge current of the condenser over a circuit including the spring contact element 141 of the second fuse, plate 139 connected thereto and spring contact element 141 of the first fuse, the third fuse being prevented from operating at this time by reason of the resistance element 122 aforesaid.

In a similar manner, fuses 3 to 9 of the counting mechanism 134 are operated in response to vibrations received by the detector 99 from the third to the ninth train respectively. The detonator 155 is now connected to the cathode of the tube 125 by a circuit including the spring contact elements 141 and contact plates 139 of each of the operated fuses 1 to 9 of the counting mechanism whereby the firing of tube 125 in response to vibrations received by the detector device 99 from the tenth train causes the discharge current from condenser 42 to flow through and operate the detonator 155 and thus explode the mine beneath the locomotive or first car of the train with sufficient force to derail and wreck the train.

Whereas in the foregoing example it has been assumed that the tenth train passing the mine was selected for destruction, it will, of course, be understood this is by way of example only as any lesser number of trains may have been selected for safe passage before the mine is exploded by the next succeeding train, it being merely necessary to connect conductor 173 to a selected spring contact element 141 of the counting mechanism 134. Furthermore, while in the illustrated embodiment of the mechanism the counting mechanism 134 comprises nine fuses it will, of course, be understood that, if desired, a greater number of fuses and contact elements therefor may be employed without departing from the spirit and scope of the present invention.

In the event that the plunger 69 is released for any reason such, for example, as by the premature severance of the wire 72 as the result of accidental breakage of the glass ampule 77 and the release of the corrosive liquid therefrom prior to the withdrawal of the arming wire 27, the tapered end 78 of the plunger 69 is moved by the spring 71 into forcible engagement with the registered portion 79 of the rod 63 thereby locking the rod in the position shown in Fig. 10 whereby movement of the rod 63 is prevented as the arming wire 27 is withdrawn and thus the plunger 62 is locked in an initial safe position. The arming switch 88 therefore remains unoperated after the arming wire is withdrawn and the mine is thus rendered perfectly safe during the assembly, transportation and planting thereof.

Furthermore, in the event that the adjustment of the vibration responsive inertia element 108 should, through negligence or for any other reason, be such that the contacts of the switch mechanism 99 remain continuously closed while no vibrations are being received, the operation of the arming switch 88 applies a potential to the grid of the tube 125 by way of the closed contacts of switch mechanism 99 sufficient to cause the tube to glow in response to current flowing between the cathode and the grid of the tube, the glow of the tube being characterized by an orange color. Under these conditions, an arc between the plate and cathode elements of the tube is not struck by reason of insufficient voltage being applied to the plate of the tube, the plate voltage of the tube being reduced by the discharged or partially charged condition of the condenser 42. Furthermore, the grid cathode glow within the tube 125 prevents the condenser 42 from becoming charged to a potential sufficient to cause the tube to strike an arc and pass sufficient current to operate the counting mechanism 134. The glow discharge of the tube between the grid and cathode also causes the battery BA to become discharged without firing the mine.

Briefly stated in summary, the foregoing invention contemplates the provision of a new and improved mine having means for counting a predetermined number of series of vibrations received through the surrounding ground or object to which the mine is secured and having means adapted to fire the mine when a predetermined number of series of vibrations are received in time spaced relation. Furthermore, the mine of the present invention is provided with new and improved means for delaying the arming of the mine until a predetermined period of time has elapsed after an arming wire has been withdrawn therefrom.

For purposes of illustration, this invention has been described in connection with a land mine for use in destroying a train, but it is obviously not so limited, being adapted for use in various ways such, for example, as in the destruction of bridges or, if desired, in the destruction of automotive craft of various types by vibrations received therefrom. Also, the embodiment of the invention may take other specific forms without a departure from spirit or principles herein described. The present embodiment is therefore illustrative and not restrictive, the scope of the invention being indicated by the appended claims rather than by the foregoing description, and all changes within the meaning and range of equivalency of the claims are intended to be embraced therein.

The invention herein described and claimed may be manufactured and used by or for the Government of the United States of America for governmental purposes without payment of any royalties thereon or therefor.

What is claimed as new and desired to be secured by Letters Patent of the United States is:

1. A mine of the character disclosed adapted to be fired in response to vibrations received from a moving vehicle, a source of electrical power, a normally inactive discharge tube connected to said source of power, a normally charged condenser connected to the anode of said tube and adapted to be discharged as the tube is fired, a control element for said tube, a vibration responsive device connected to said control element and to said source of power respectively and adapted to fire the tube in response to said vibrations, an explosive charge within the mine, and electroresponsive means adapted to fire the explosive charge by discharge current received from the condenser.

2. A mine of the character disclosed adapted to be controlled by pressure impulses received thereby, a source of electrical power, a pair of normally open contacts, means for closing said contacts as the impulses are received, a normally charged condenser operatively connected to said source of power to receive a charge therefrom, a discharge circuit for said condenser, an electronic tube included within said discharge circuit and adapted to discharge the condenser as the tube is fired in unit cycles, means including said source of power and said contacts for firing the tube selectively in accordance with the strength of said impulses, counting means arranged within said discharge circuit and adapted to count the firing cycles of said tube, detonating means, and means included within said counting means for operatively connecting the detonating means to said condenser when a predetermined number of unit cycles have been counted whereby the detonating means is fired during the next succeeding discharge of the condenser.

3. In a mine of the character disclosed, the combination of a source of electrical power, a condenser, means for normally charging the condenser to the potential of said source of power, a discharge circuit for said condenser, a discharge tube arranged within said circuit and adapted to discharge the condenser as the tube fires, vibration controlled means for firing said tube, and detonating means within said discharge circuit and adapted to fire the mine by discharge current received from said condenser.

4. In a mine of the character disclosed, the combination of a condenser, a source of electrical power, means including an arming switch for operatively connecting the condenser to said source of power, an electronic tube connected to said condenser and adapted to discharge the condenser as the tube is fired, vibration responsive means for firing said tube, a counting device settable at will to different settings and adapted to be operated by the discharge current received from said condenser as the tube is fired, detonating means, and means included within said counting device for causing the detonator to be fired by the discharge current of the condenser when the counting device has made a predetermined number of counting operations.

5. In a firing mechanism for a mine, the combination of a source of electrical power, a vibration detecting device electrically connected to said source of power and having means for closing a circuit as the vibrations are detected, a discharge tube having a control element thereof connected to said circuit closing means and adapted to be controlled thereby, a normally charged condenser operatively connected to said source of power to receive a charge therefrom, said condenser being also connected to the anode of said tube and adapted to be discharged as the tube is fired, a counting device within the discharge circuit of said condenser and adapted to be operated by the discharge current therefrom, a resistive device in parallel with said counting device and adapted to extinguish the tube while the condenser is being discharged thereby to prevent more than one operation of the counting device during each discharge of the condenser, and electroresponsive detonating means operatively connected to said counting device and adapted to be fired by said discharge current when the counting device has made a predetermined number of operations.

6. In a mine of the character disclosed adapted to be fired by vibrations received from a moving body, in combination, a vibration detecting device having means adapted to close a circuit selectively in accordance with the character of the vibrations received, a source of electrical power connected to said circuit, a discharge tube having the control element thereof operatively connected to said circuit and adapted to be fired as the circuit is closed, a normally charged condenser connected to the anode of said tube and adapted to be discharged as the tube is fired, a counting device adapted to be operated by the discharge current from said condenser, and means for preventing the condenser from charging sufficiently to fire the tube after the condenser has been discharged until a predetermined period of time has elapsed after the contacts of said detecting device have been maintained continuously disengaged whereby the counting device is prevented from making more than one operation in response to a series of vibrations received in closely spaced time relation by said vibration detecting device.

7. In a mine of the character disclosed adapted to be planted within the roadbed of a railroad, means within the mine for detecting vibrations received through the roadbed from a moving train, means for initially arming the mine, means including a source of electrical power and an electron device controlled by said detecting means for generating a firing impulse signal as vibrations are detected by said detecting means, means for disarming the mine while vibrations are being continually received by said detecting means after the firing impulse signal has been generated and for rearming the mine when a predetermined period of time has elapsed after the vibrations are no longer received by said detecting means, a counting device operatively connected to said electron device and adapted to be operated in unit cycles respectively corresponding to each of said firing impulse signals, and detonating means operatively connected to said counting device and adapted to be fired by said firing impulse signal when the counting device has made a predetermined number of unit cycles of operations.

8. In a mine of the character disclosed adapted to be fired by vibrations received from a vehicle and without contact with the vehicle, a vibration responsive device having means adapted to close a circuit as vibrations are received thereby, a source of electrical power, an arming switch adapted to connect the vibration responsive device to the source of power as the arming switch operates, a condenser, a pair of normally closed contacts on said arming switch adapted to short circuit the condenser when the switch is unoperated, one of said pair of normally closed contacts being adapted to remove the short circuit from the condenser and connect the condenser to the source of power as the switch operates, a detonating device, a second pair of normally closed contacts on said switch adapted to short circuit the detonating device when the switch is unoperated and to render the detonating device responsive to a voltage applied thereto when the arming switch is operated, an electronic tube adapted to discharge said condenser as the tube is fired, a control element on said electronic tube connected to said vibration responsive device and adapted to operate the electronic tube as said circuit is closed, counting means adapted to be operated by the discharge current of said condenser, and means on said counting means for causing the detonating device to be fired when the counting means has made a predetermined number of operations.

9. In a mine adapted to be fired by vibrations received through the surrounding terrain, in combination, a mine firing mechanism comprising a vibration detector, an electronic tube controlled by said vibration detector, a normally charge condenser adapted to be discharged by said tube, detonating means within the discharge circuit of said condenser, a source of electrical power, an arming switch adapted to connect the firing mechanism to said source of power as the switch operates, an arming wire adapted to be withdrawn from the mine as the mine is planted within said terrain, a spring pressed plunger adapted to be released from an initial cocked position as the arming wire is withdrawn, and means including a frangible ampule arranged within the path of travel of said plunger and adapted to be broken thereby as the plunger is released for operating said arming switch when a predetermined period of time has elapsed after the arming wire has been withdrawn.

10. In an arming mechanism for a mine, the combination of an arming switch, means including a plunger for actuating said switch from an initial position to an armed position, means including a rod for releasably locking said plunger in an initial set position, a container within which a portion of said rod is disposed, a frangible ampule within said container having a supply of corrosive fluid therein, a normally locked spring pressed plunger adapted to break said ampule and thereby bring the corrosive fluid into contact with said rod, and means including an arming wire adapted to release said last named plunger and cause the rod to be severed by the corrosive action of said fluid whereby the arming switch is actuated to said armed position in predetermined time delayed relation with respect to the withdrawing of the arming wire from said arming mechanism.

11. In an arming mechanism for a mine, in combination, an arming wire adapted to be withdrawn from the mechanism, a spring pressed plunger releasably secured in an initial locking position by said arming wire, a tubular member within which an end portion of the spring pressed plunger is transversely and slideably arranged when the plunger is in said initial locking position, a second plunger slideably arranged within said tubular member and releasably locked in an initial set position by said spring pressed plunger, an arming switch having an actuating element disposed within the path of travel of said second plunger and adapted to be operated thereby when the spring pressed plunger has been withdrawn from locking engagement with said second plunger, means including said arming wire for maintaining the spring pressed plunger in continuous locking engagement with the second plunger until the arming wire is withdrawn, a third plunger slideably arranged within said tubular member, means for continuously and yieldably urging said third plunger toward said second plunger, a rod secured to said third plunger and adapted to prevent movement of the third plunger from an initial position until the rod is severed, a frangible container having a quantity of corrosive fluid therein arranged adjacent said rod whereby the rod is adapted to be severed by the corrosive action of the fluid in predetermined time delayed relation with respect to the release of the fluid from the container, a second spring pressed plunger adapted to break the container and release the fluid therefrom, means including said arming wire for releasably maintaining said second spring pressed plunger in an initial cocked position, and means on said third plunger adapted to engage and maintain said first named spring pressed plunger in continuous locking engagement with said second plunger when the rod has been severed prior to the withdrawal of the arming wire from locking engagement with the first named spring pressed plunger.

12. In a mine of the character disclosed adapted to be planted within the roadbed of a railroad and fired by vibrations received through the roadbed from a moving train, the combination of a vibration detecting device having means for closing a circuit selectively in accordance with the strength of the vibrations detected thereby, an electron discharge tube having the control element thereof connected to said circuit and adapted to be fired as the circuit is closed, a source of electrical power connected to said circuit and to the anode of said tube, means including a normally charged condenser connected to said anode and adapted to be discharged as the tube is fired thereby to generate a firing signal in response to said vibrations as the first vehicle of the train moves to a position adjacent the mine, a counting device adapted to be operated by said firing signal, means including a resistive element in the charging circuit of said condenser for preventing an additional firing signal from being generated until a predetermined period of time has elapsed after the last vehicle of the train has passed the mine, and detonating means operatively connected to said counting device and adapted to be fired by said firing signal when the counting device has made a predetermined number of operations.

13. In a mine of the character disclosed adapted to be planted in the earth along the right of way of a moving vehicle, in combination, a cylindrical casing having an explosive charge arranged therein, a circular cover for said casing, a member fixed to said cover inside the casing and adapted to move in response to vibrations received through the earth from the moving vehicle, electron discharge tube apparatus including a normally nonconducting gaseous discharge tube and a source of power for energizing the tube, means responsive to said member as it moves in response to said vibrations for firing said tube, means connected to said tube and responsive to a predetermined number of firings of the tube for exploding said charge, and means including a compressible gasket for securing the cover to said casing in watertight relation therewith thereby to prevent undesired moisture from reaching said electron discharge tube apparatus and said source of power when the mine is planted in the earth.

14. In a mine of the character disclosed adapted to be planted in the earth along the right of way of a moving vehicle, in combination, a cylindrical casing having an explosive charge arranged therein, a circular cover for said casing, a member fixed to said cover inside the casing and adapted to move in response to vibrations received through the earth from the moving vehicle, electron discharge tube apparatus including a normally nonconducting gaseous discharge tube and a source of power for energizing the tube, means responsive to said member as it moves in response to said vibrations for firing said tube, means connected to said tube and responsive to a predetermined number of firings of the tube for exploding said charge, means including a compressible gasket for securing the cover to said casing in watertight relation therewith thereby to prevent undesired moisture from reaching said apparatus and said source of power when the mine is planted in the earth, and at least one bracket secured to said casing and adapted to receive a strap whereby the mine may be transported and concealed beneath the clothing worn by an operative.

References Cited in the file of this patent

UNITED STATES PATENTS

| | | |
|---|---|---|
| 1,276,706 | Aydelotte | Aug. 27, 1918 |
| 1,491,004 | Duffie | Apr. 22, 1924 |
| 1,538,316 | Duffie | May 19, 1925 |
| 1,682,560 | Gruber | Aug. 28, 1928 |
| 1,748,965 | Watson | Mar. 4, 1930 |
| 2,341,351 | Barkley | Feb. 8, 1944 |
| 2,403,567 | Wales | July 9, 1946 |

FOREIGN PATENTS

| | | |
|---|---|---|
| 11,499 | Great Britain | Sept. 9, 1886 |
| 750,351 | France | May 22, 1933 |
| 541,624 | Great Britain | Dec. 4, 1941 |